(12) United States Patent
Greene

(10) Patent No.: US 9,743,133 B2
(45) Date of Patent: Aug. 22, 2017

(54) APPARATUS, SYSTEMS AND METHODS FOR SATELLITE SYSTEM FAST CHANNEL CHANGE

(71) Applicant: EchoStar Technologies L.L.C., Englewood, CO (US)

(72) Inventor: Gregory Greene, Littleton, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

(21) Appl. No.: 14/854,325

(22) Filed: Sep. 15, 2015

(65) Prior Publication Data
US 2017/0078735 A1 Mar. 16, 2017

(51) Int. Cl.
| | |
|---|---|
| *H04N 7/173* | (2011.01) |
| *H04N 21/438* | (2011.01) |
| *H04N 21/61* | (2011.01) |
| *H04N 21/845* | (2011.01) |
| *G11B 27/10* | (2006.01) |
| *H04N 21/2343* | (2011.01) |
| *H04N 21/63* | (2011.01) |
| *H04N 7/16* | (2011.01) |

(52) U.S. Cl.
CPC ........ *H04N 21/4384* (2013.01); *G11B 27/10* (2013.01); *H04N 21/234363* (2013.01); *H04N 21/6125* (2013.01); *H04N 21/6143* (2013.01); *H04N 21/631* (2013.01); *H04N 21/8456* (2013.01)

(58) Field of Classification Search
CPC ........... H04N 21/4384; H04N 21/6143; H04N 21/8456; H04N 21/23463; H04N 21/236; H04N 21/2347; H04N 21/2743; H04N 21/23855; H04N 21/23113; H04N 21/47202; H04N 21/26613; H04N 21/23; A01B 12/006; G11B 27/10
USPC ...................................................... 725/90, 98
See application file for complete search history.

(56) References Cited

U.S. PATENT DOCUMENTS

| | | | |
|---|---|---|---|
| 8,352,627 B1* | 1/2013 | Mackie | G06F 17/30905 370/465 |
| 8,874,778 B2* | 10/2014 | Xu | H04N 21/44209 370/256 |
| 2005/0048916 A1* | 3/2005 | Suh | H04H 20/28 455/39 |
| 2008/0301749 A1* | 12/2008 | Harrar | H04N 5/44543 725/131 |

(Continued)

*Primary Examiner* — Pankaj Kumar
*Assistant Examiner* — Reuben M Brown
(74) *Attorney, Agent, or Firm* — Lowe Graham Jones PLLC

(57) ABSTRACT

Fast channel change systems and methods are operable to change channels to a newly selected media content event in response to a user request. An exemplary embodiment communicates a previously stored low resolution version segment of the newly selected media content event to a presentation system while the media device is performing a tuning operation to change channels to receive a currently broadcasting high resolution version of the newly selected media content event. Once the tuning process has been completed at the media device, a handshake process is performed wherein the media device transitions presentation from the low resolution version to the high resolution version of the newly selected media content event.

19 Claims, 4 Drawing Sheets

(56) References Cited

U.S. PATENT DOCUMENTS

| | | | |
|---|---|---|---|
| 2012/0323868 A1* | 12/2012 | Robbin | G06F 17/30899 |
| | | | 707/695 |
| 2015/0007239 A1* | 1/2015 | Cranman | H04N 21/2402 |
| | | | 725/95 |
| 2015/0199138 A1* | 7/2015 | Ramachandran | G06F 3/0611 |
| | | | 711/103 |
| 2016/0055621 A1* | 2/2016 | Cai | G06T 3/4007 |
| | | | 345/669 |
| 2017/0078735 A1* | 3/2017 | Greene | H04N 21/4384 |

* cited by examiner

APPARATUS, SYSTEMS AND METHODS FOR SATELLITE SYSTEM FAST CHANNEL CHANGE

BACKGROUND

Media devices, such as a set top box, are configured to receive media content communicated from a satellite-based communication system that distributes media content using a plurality of satellites of that are in a geosynchronous orbit above a plurality of media devices. Each satellite has a plurality of transponders that each receive a broadcast stream of media content in an uplink signal that is communicated from a ground station (interchangeably referred to herein as a media transmit facility). Each satellite transponder then broadcasts the stream of media content in a signal down to thousands of media devices. Each transponder signal (interchangeably referred to herein as a downlink signal) is transmitted at a particular predefined frequency, thereby keeping each of the different transponder signals separate from each other. An example satellite may have as many as thirty-two transponders that are each concurrently broadcasting, at their assigned predefined frequency, a stream of media content towards the earth to be received by the media devices.

Each media device is communicatively coupled to an antenna. The antenna is oriented upwards into the sky so as to be able to receive the broadcasting satellite transponder signals. A low noise block (LNB) converter detects the different transponder signals received at the antenna. These detected transponder signals, each at a particular predefined frequency, are amplified and processed, and are then communicated to the media device.

To receive a particular media content event that is of interest to a user of the media device, the media device must determine which of the plurality of particular transponders is broadcasting the media content event of interest. The media content event of interest is specified by the user of the media device, either for current presentation herein the user views the media content event or for recording for later viewing. A broadcast media content event typically identified by its title and by a particular "channel" that the media content event will be available on. The user may specify the media content event of interest using its title, and/or by specifying the channel that the media content event of interest is being broadcast on. Table information or the like that relates a title or channel to the particular transponder signal that is providing the media content event of interest resides at the media device. The table information is used to identify the particular transponder signal that has the media content event of interest therein.

Then, the media device "tunes" itself to receive the transponder signal being broadcast by the identified transponder. Since each transponder signal is being broadcast at a particular predefined frequency, the media device configures its signal receiving system to process the signals received from the LNB converter at the associated frequency of the transponder that is currently broadcasting the media content event of interest. This process is hereinafter interchangeably referred to as "tuning". Once the correct transponder signal has been tuned to and is being processed by the media device's signal receiving system, the streaming media content event of interest may be further processed into video and audio content, and then communicated to a presentation system, such as a television or the like.

This tuning process (identifying which particular transponder to tune to, looking up the associated frequency of the transponder signal associated with the identified transponder, and then tuning the media device's signal receiving system to receive the identified transponder signal frequency) may take the media device a noticeable amount of time to complete. Once the tuning process has been completed by the media device, the media content event of interest can then be presented (or recorded for later viewing) during the continued live broadcast of the media content event of interest.

Frequently, a user of the media device may decide to watch or record a different media content event. The user operates the media device, typically using a remote control, to select the new media content event of interest. Often, the newly selected media content event of interest is receivable in a different transponder signal. Accordingly, the media device must then identify which particular transponder to tune to, look up the frequency of the associated transponder signal, and then tune its signal receiving system to receive the identified transponder signal frequency that has the newly selected media content event of interest therein.

Because there is a noticeable time period for the media device to tune to the transponder signal providing the new media content event selected by the user, there is a noticeable delay period (hereinafter referred to herein as a "tuning delay period") before presentation of the newly selected media content event to the user can begin. During this tuning delay period, some media devices may simply present a blank screen to the user while the tuning process is occurring. Other systems may present the last processed still image of the currently presented media content event until the tuning process has been completed. Some media devices may have a plurality of tuners therein so that presentation of the currently presented media content event continues until the completion of the tuning process. Once the tuning process has been completed, presentation of the newly selected media content event may begin.

Other media content delivery systems may be used to communicate media content to a media device. These other media content delivery systems may have similar tuning delay periods to complete the tuning process that is necessary to present a newly selected media content event to the user of the media device. Such tuning delay periods may also be noticeable to the user.

Typically, the user does not like the noticeable delay in presentation of a newly selected media content event. These noticeable delays may be distracting to the user and/or may be perceived to be a needless waste of the user's personal time. Such users would prefer a more instantaneous transition from the currently presented media content event to the newly selected media content event.

Accordingly, there is a need in the arts to provide a faster presentation transition from the currently presented media content event to presentation of a newly selected media content event.

SUMMARY

Systems and methods of a fast channel change are disclosed. An exemplary embodiment communicates a previously stored low resolution version segment of the newly selected media content event to a presentation system while the media device is performing a tuning operation to change channels to receive a currently broadcasting high resolution version of the newly selected media content event. Once the tuning process has been completed at the media device, a handshake process is performed wherein the media device transitions presentation from the low resolution version to the high resolution version of the newly selected media content event.

BRIEF DESCRIPTION OF THE DRAWINGS

Preferred and alternative embodiments are described in detail below with reference to the following drawings.

DETAILED DESCRIPTION

Figure 1:
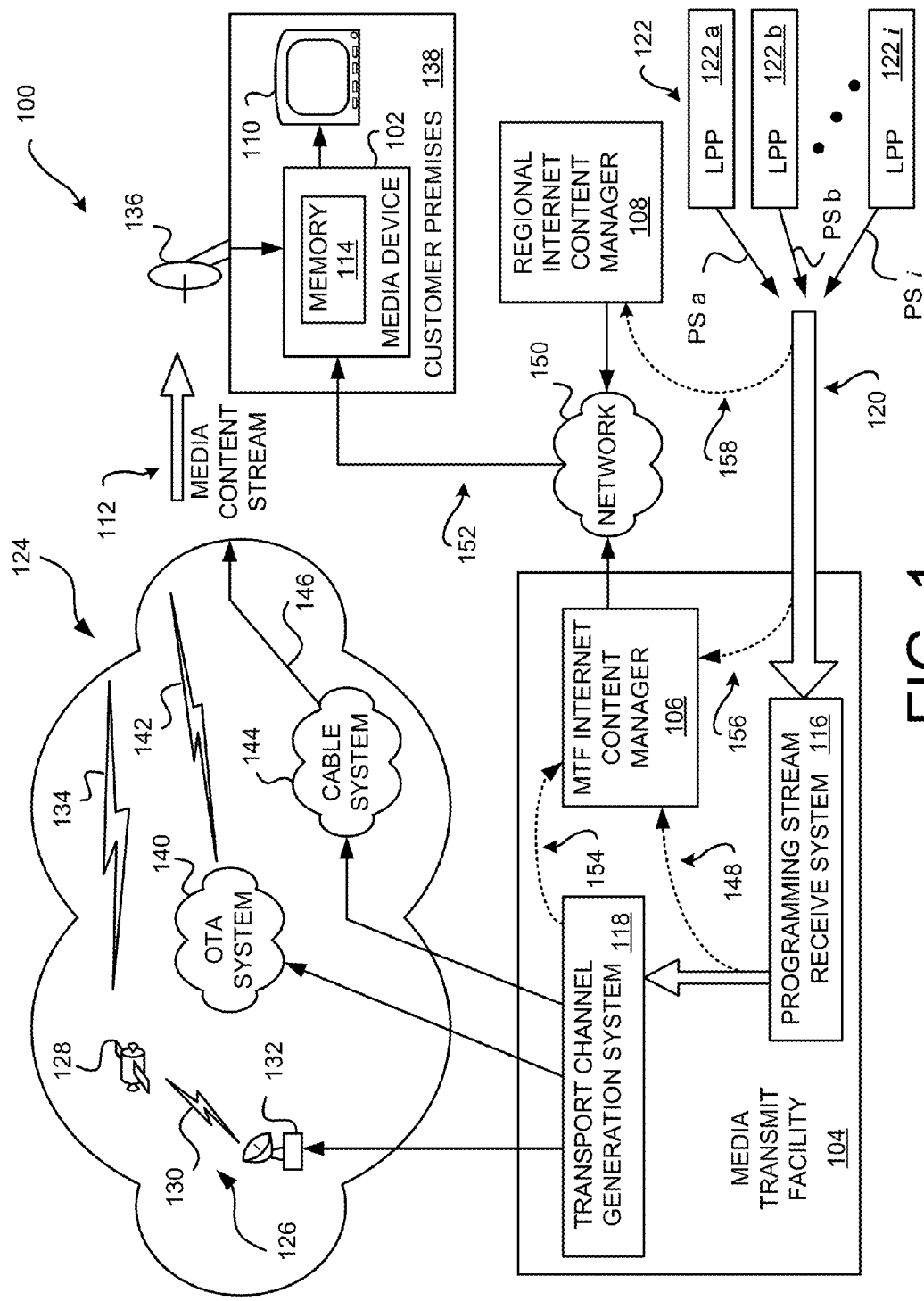
FIG. 1 is a block diagram of an embodiment of a fast channel change system implemented in a communication environment that includes a media device, a media transmit facility (MTF), and an MTF internet content manager and/or a regional internet content manager.

FIG. 1 is a block diagram of an embodiment of a fast channel change system 100 implemented in a communication environment that includes a media device 102, a media transmit facility (MTF) 104, and an MTF internet content manager 106 and/or a regional internet content manager 108. Examples of a media device 102 include, but are not limited to, a set top box (STB), a surround-sound receiver, a radio, a television (TV), a digital video recorder (DVR) device, a game playing device, or a personal computer (PC), a smart phone, a notepad, a laptop computer, or other electronic device that is configured to receive different channels of broadcasting media content.

Embodiments of the fast channel change system 100, in response to a channel change to a newly selected media content event by the user of the media device 102, initially presents a low resolution version of the newly selected media content event. The low resolution version of the newly selected media content event is nearly immediately presented by components of a media content presentation system 110. Presentation of the low resolution version continues until the media device 102 completes the tuning process to receive a high resolution version of the newly selected media content event. Once the tuning process is completed to the particular media content stream 112 having the newly selected media content event therein, the media device 102 transitions presentation from the low resolution version to the high resolution version of the newly selected media content event. The transition is nearly seamless such that there is no or little noticeable change in presentation from the low resolution version to the high resolution version of the newly selected media content event. Accordingly, the effect of the noticeable time period for the media device to tune to the transponder signal providing the new media content event selected by the user is masked by presentation of the low resolution version of the newly selected media content event.

Various embodiments of the fast channel change system 100 are configured to provide low resolution versions of a plurality of media content events to the media device 102 for a plurality of different channels that are receivable by the media device. The short duration low resolution versions of the media content events are stored in a memory 114 of the media device 102. In response to the user selecting a new media content event of interest, the media device 102 accesses the stored short duration low resolution version of the newly selected media content event from its memory 114, such that presentation of the low resolution version of the newly selected media content event may immediately (or at least nearly immediately) begin. Concurrently, the media device 102 initiates the tuning process to receive the media content stream 112 having the high resolution version of the newly selected media content event.

Once the tuning process has been completed and the processing of the high resolution version is underway, embodiments of the fast channel change system 100 identify a matching low resolution image frame in the low resolution version and a corresponding high resolution image frame in the high resolution version of the newly selected media content event. The low resolution image frame and the high resolution image frame both present the same image, but at different resolutions. During real time presentation of the newly selected media content event, a "handshake" operation is performed wherein presentation of the low resolution version ends at the presentation time of the identified matching low resolution image frame and presentation of the high resolution version begins with the identified high resolution image frame.

To facilitate disclosure of an exemplary embodiment of the fast channel change system 100, the operating environment in which media content events are communicated (interchangeably referred to herein as a "broadcast") to a plurality of media devices 102 is now described. In an example embodiment of the fast channel change system 100, an MTF content manager 106 resides at the media transmit facility 104. The media transmit facility 104 further comprises a programming stream receive system 116 and a transport channel generation system 118.

A media content provider operating the media transmit facility 104 receives a stream of media content 120, in the form of a plurality of media content events, from a plurality of local program providers (LPPs) 122 or other content providers. For example, FIG. 1 conceptually illustrates that the programming stream receive system 116 receives the stream of media content 120 comprising a streaming plurality of programs PSa-PSi from the local programming providers 122 (LPPs 122a-122i). In some environments, a group of LPPs 122 are located in a common geographic region. The streams of media content may be aggregated at a local site (not shown) and communicated together to the programming stream receive system 116. Thus, the programming stream receive system 116 is appreciated to be configured to receive multiple streams of media content 120 from a variety of different sources.

The provided stream of media content events may include, but are not limited to, a television program, a newscast, a broadcast sports event, a movie, or the like. The media content is typically provided in the form of a video stream and a synchronized audio stream. The programming stream receive system 116 processes the received media content streams as necessary to prepare them for transmission over a broadcast system to a plurality of media devices 102. For example, commercials or the like may be incorporated with a particular media content event. Alternatively, or additionally, the media content may be associated with identifiers, such as a channel number and/or a station call sign. The processed media content is aggregated by the programming stream receive system 116 for processing into a form that is suitable for broadcasting to the plurality of media devices 102. The transport channel generation system 118 further processes the media content streams of into the transmission signals for the actual transmission over a broadcast communication system 124.

In a satellite-based broadcast system 126, the processed programs PSa-PSi are communicated from the programming stream receive system 116 to the transport channel generation system 118. The transport channel generation system 118 bundles selected ones of the programs PSa-PSi into one or more transport channels. Then, one or more of the transport channels are uplinked to (transmitted to or communicated to) a satellite 128 in an uplink signal 130, via a corresponding transmit antenna 132.

The respective transport channels received by the satellite 128 are then down linked to (transmitted to or communicated to), in the form of a wireless downlinked transponder signal 134, from one or more of the satellites 128 to a receiver antenna 136 at the customer premises 138. The received wireless downlinked transponder signal 134 with the transport channel therein is then communicated from the LNB of the receiver antenna 136 to the media device 102. The receiver antenna 136 and the media device 102 may be configured to receive multiple downlink signal transport channels from a plurality of satellites 128.

Alternatively, or additionally, the broadcast communication system 124 may employ an over the air (OTA) system 140 wherein a stream of media content is communicated using a wireless signal 142 that is received by the receiver antenna 136. Alternatively, or additionally, the broadcast communication system 124 may employ a cable system 144 wherein a wire-based signal is communicated using a suitable cable 146 or the like that is coupled to the media device 102. Non-limiting examples of the cable 146 include a fiber optic cable, a coaxial cable, and telephone line.

A media content event of interest may be selected by a user who provides suitable instructions to the media device 102. The media content event of interest is identified by its particular "channel" and/or call sign. The media device 102 tunes itself to the particular transport channel on which the selected media content event of interest is available, and then retrieves the selected media content event of interest from the transport channel based on its assigned identifier, such as a packet identifier (PID) or the like. The media content event of interest is then assembled into a stream of program content and is communicated from the media device 102 to components of the media content presentation system 110. The components of the media content presentation system 110 then present the video and audio portions of the media content event to the user of the media device 102.

In an example embodiment, the MTF internet content manager 106 concurrently receives the processed media content streams 148 from the programming stream receive system 116. The MTF internet content manager 106 further processes the received streams of media content for communication to the plurality of media devices 102 over the network 150 (interchangeably referred to herein as the communication network 150).

In an example, embodiment, the MTF internet content manager 106 processes the received media content into a low resolution version of the media content events in the received media content streams 148. Any suitable method or process of generating a low resolution version from a high resolution version of a media content event may be used by the various embodiments. The processed high resolution version may be provided in a standard definition format, a high definition format, or any other available definition format.

Alternatively, or additionally, one or more of the received media content events may already be in a low resolution format. If available, the low resolution versions may be directly provided to the MTF internet content manager 106. For example, but not limited to, the low resolution versions of the media content events may be provided by the LPPs 122, by the programming stream receive system 116, or by another electronic device or system (not shown).

The MTF internet content manager 106 is configured to output the low resolution version media content events to the media devices 102. Here, each of the plurality of media devices 102 establish a communication link 152 to the MTF internet content manager 106, via the communication network 150. All of the low resolution version media content events, or selected ones of the low resolution version media content events, are then communicated to the media devices 102.

Since the programming stream receive system 116 and the transport channel generation system 118 are concurrently receiving the same streams of content, the low resolution version of the media content events provided by the MTF internet content manager 106 may be provided in near real time. That is, the MTF internet content manager 106 may provide the low resolution version media content events at substantially the same time that the transport channel generation system 118 is broadcasting the corresponding high resolution version media content events to the media devices 102. Thus, any particular media device 102 is concurrently receiving one or more broadcasting media content streams 112 with the high resolution media content events (via the broadcast communication system 124) and the low resolution version media content events (via the communication network 150).

Alternatively, the MTF internet content manager 106 may receive a stream of media content 154 from the transport channel generation system 118. Here, the timing of the output of the low resolution version media content events from the MTF internet content manager 106 may be more easily managed since the MTF internet content manager 106 is receiving a copy of the media content that is being broadcast from the transport channel generation system 118.

Alternatively, the MTF internet content manager 106 may receive a stream of media content 156 from the stream of media content 120 provided by the plurality of local program providers (LPPs) 122 or other content providers. Here, the MTF internet content manager 106 receives the same media content as the programming stream receive system 116. However, the MTF internet content manager 106 may separately generate the low resolution version media content events. Such a configuration may reduce computational and processing requirements on the programming stream receive system 116 (which then does not have to generate low resolution version media content events), and may be particularly suitable to retrofit a legacy broadcasting media transmit facility 104 with an embodiment of the fast channel change system 100. Communication of the low resolution version media content events must then be coordinated with the actual broadcast of the high resolution version media content events. For example, a schedule or the like that indicates broadcast times and other information may be used to define the times that the MTF internet content manager 106 should provide the corresponding low resolution version media content events.

In some embodiments, a regional internet content manager 108 may be located in a geographic region that has a group of LPPs 122 therein. The regional internet content manager 108 may receive a stream of media content 158 from individual LPPs 122 and/or from the local site that aggregates the media content provided by the LPPs 122 in its particular geographic region. The received stream of media content may be a high resolution versions of the media content events provided by the LPPs 122. The received high resolution media content is processed into a corresponding low resolution version of the media content. Alternatively, or additionally, the regional internet content manager 108 may receive low resolution version media content events for the LPPs and/or the local site.

Communication of the low resolution version media content events from the regional internet content manager 108 to the media devices 102 must be coordinated with the actual broadcast of the high resolution version media content events from the media transmit facility 104. For example, a schedule or the like that indicates broadcast times and other information may be used to define the times that the MTF internet content manager 106 should provide the corresponding low resolution version media content events.

In such embodiments that employ regional internet content manager 108 to provide low resolution version media content events, it is appreciated that bandwidth over the communication network 150 may be reduced. Here, media devices 102 located in the same geographic region may access the media content provided locally in its own geographic region. Media content provided in other geographic regions, presumably of less interest to the users of those commonly located media devices 102, does not need to be provided to the commonly located media devices 102.

It is further appreciated that a combination system employing a MTF internet content manager 106 and a plurality of regional internet content managers 108 may be desirable to optimize communication bandwidth over the communication network 150. Here, particular stations providing media content that is of interest to all users may be provided by the MTF internet content manager 106. Examples of such content include national broadcasted serial programs, national and/or international newscast programs, sporting events, premium channel movies and events, or the like. Thus, a portion of the bandwidth over the communication network 150 is used by all media devices 102 to receive that type of content. Content that is of local interest is provided by the regional internet content manager 108. Thus, a limited amount of bandwidth can be locally allocated in the communication network 150 so that commonly located media devices 102 access the low resolution version media content events that are produced locally.

The communication network 150 is illustrated as a generic communication system. In one embodiment, the communication network 150 comprises a cellular telephone system, such as a radio frequency (RF) wireless system. Accordingly, the media device 102 includes a suitable transceiver. Alternatively, the communication network 150 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment.

Figure 2:
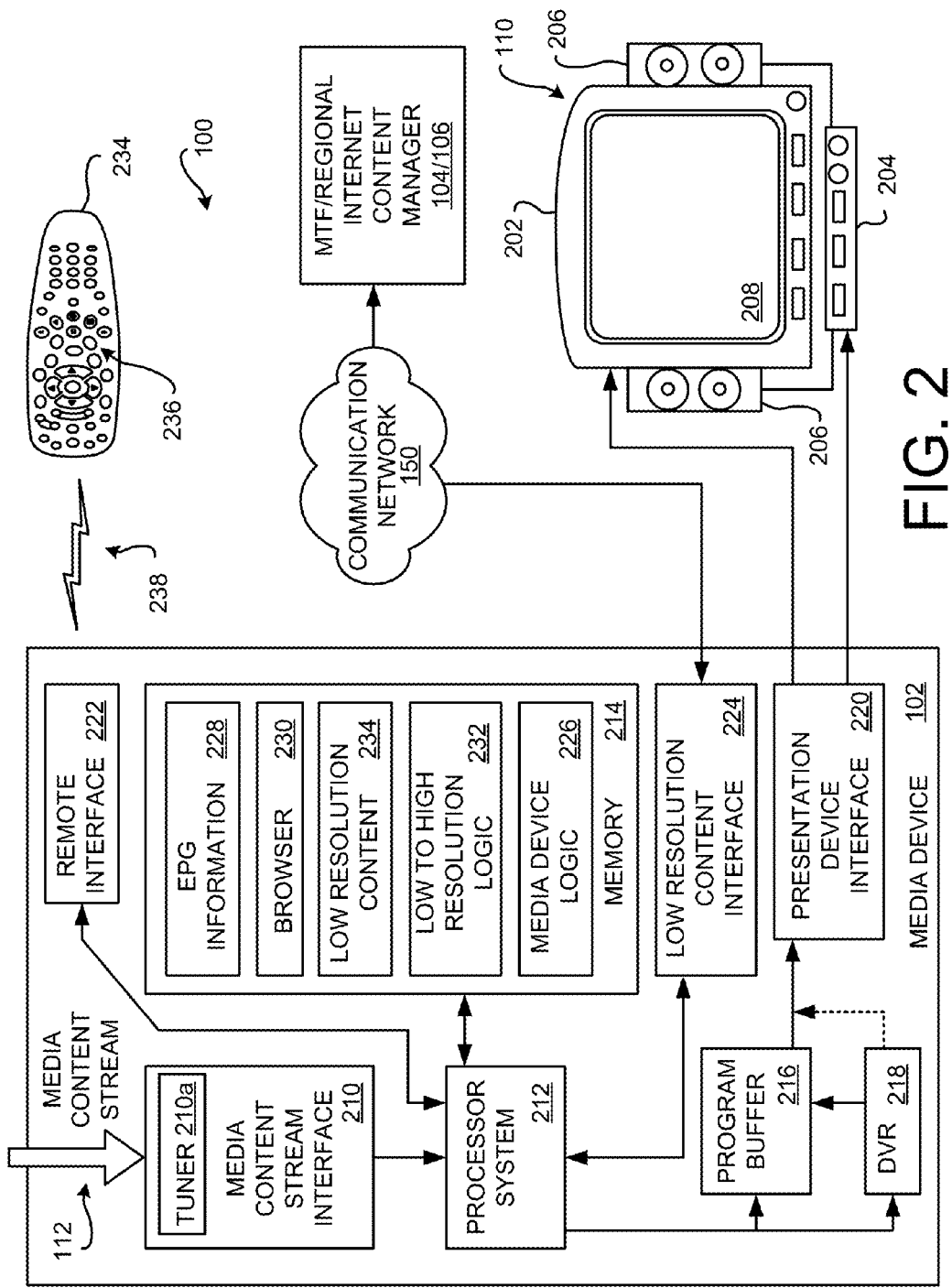
FIG. 2 is a block diagram of a fast channel change system that is operable to control a media device, such as, but not limited to, a set top box.

FIG. 2 is a block diagram of a fast channel change system 100 that is operable to control a media device 102, such as, but not limited to, a set top box (STB). The exemplary media device 102 is communicatively coupled to a media content presentation system 110 that includes a visual display device 202, such as a television (hereafter, generically a TV), and an audio presentation device 204, such as a surround sound receiver controlling an audio reproduction device (hereafter, generically, a speaker 206). Other types of output devices may also be coupled to the media device 102, including those providing any sort of stimuli sensible by a human being, such as temperature, vibration and the like. The video portion of a selected media content event is displayed on the display 208 and the audio portion of the media content event is reproduced as sounds by one or more speakers 206. In some embodiments, the media device 102 and one or more of the components of the media content presentation system 110 may be integrated into a single electronic device.

Embodiments of the fast channel change system 100 implemented in the media device 102 are configured to present a stored portion of a low resolution version of a newly selected media content event while the media device 102 performs a tuning operation to receive and process a media content stream 112 having the high resolution version of the newly selected media content event. The non-limiting exemplary media device 102 comprises a media content stream interface 210, a processor system 212, a memory 214, a program buffer 216, an optional digital video recorder (DVR) 218, a presentation device interface 220, a remote interface 222, and a low resolution content interface 224. The memory 214 comprises portions for storing the media device logic 226, the electronic program guide (EPG) information 228, the optional browser 230, the low to high resolution logic 232, and the low resolution content 234. In some embodiments, the media device logic 226, the browser 230 and/or the low to high resolution logic 232 may be integrated together, and/or may be integrated with other logic. In other embodiments, some or all of these memory and other data manipulation functions may be provided using a remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. In a satellite broadcast system, a media content provider provides media content that is received in one or more multiple media content streams 112 multiplexed together into one or more transport channels residing in a transponder signal. The transport channels with the media content streams 112 are communicated to the media device 102 from a media system sourced from a remote media transmit facility 104 (FIG. 1) operated by the media content provider. The media device 102 is configured to receive one or more broadcasted satellite transponder signals detected by an antenna 136.

Media content streams 112 may be communicated to other media devices 102 using a different communication system. Non-limiting examples of other broadcast communication systems 124 that broadcast a media content stream 112 include a cable system, a radio frequency (RF) communication system, and the Internet.

The one or more media content streams 112 are received by the media content stream interface 210. In a broadcast environment, one or more tuners 210a in the media content stream interface 210 selectively tune to one of the media content streams 112 in accordance with instructions received from the processor system 212. The process of tuning to a particular media content stream 112 having a specified media content event therein requires a duration of time (the tuning delay period) to complete.

After the tuning process has completed, the processor system 212, executing the media device logic 226, parses out a high resolution version of the media content associated with the specified media content event of interest. The media content event of interest is then assembled into a stream of high resolution video information and/or audio information which may be stored by the program buffer 216 such that the high resolution version of the media content event can be streamed out to components of the media content presentation system 110, such as the visual display device 202 and/or the audio presentation device 204, via the presentation device interface 220. In the various embodiments, the high resolution version media content may be provided in a standard definition format, a high definition format, or any other available definition format.

Alternatively, or additionally, the parsed out high resolution version of the media content may be saved into the DVR 218 for later presentation. The DVR 218 may be directly provided in, locally connected to, or remotely connected to, the media device 102.

From time to time, information populating the EPG information 228 portion of the memory 214 is communicated to the media device 102, via the media content stream 112 or via another suitable media. The EPG information 228 portion of the memory 214 stores the information pertaining to the scheduled broadcast times of media content events. The information may include, but is not limited to, a scheduled broadcast start and/or end time, a program channel, and descriptive information. The media content event's descriptive information may include the title of the media content event, names of performers or actors, date of creation, and a summary describing the nature of the media content event. Any suitable information may be included in the supplemental information. Upon receipt of a command from the user requesting presentation of an EPG display, the information in the EPG information 228 is retrieved, formatted, and then presented on the display 208 as an EPG (not shown).

The exemplary media device 102 is configured to receive commands from a user via a remote control 234. The remote control 234 includes one or more controllers 236 disposed on the surface of the remote control 234. The user, by actuating one or more of the controllers 236, causes the remote control 234 to generate and transmit commands, via a wireless signal 238, to the media device 102. The commands control the media device 102 and/or control the components of the media content presentation system 110. The wireless signal 238 may be an infrared (IR) signal or a radio frequency (RF) signal that is detectable by the remote interface 222.

As noted above, a user (not shown) may view and listen to various media content when presented on the exemplary television 202 and/or the exemplary surround sound receiver 204. That is, based upon the user commands, typically generated at and transmitted from the remote control 234 as a wireless signal 238 that is received by the remote interface 222, the media device 102 can then control itself and/or other various media devices that it is communicatively coupled to. Accordingly, available media content is presented in accordance with the generated user commands.

More particularly, the user may select a new media content event of interest for presentation using the remote control 234. The low to high resolution logic 232, executed by the processor system 212, manages presentation of media content to the user during this channel change process. When the user specifies a particular new media content event, typically through interaction with a presented EPG, the low to high resolution logic 232 causes the processor system 212 access the low resolution version of the newly selected media content event, which is immediately (or nearly immediately) presented to the user on the display 208. When the tuning process is complete (wherein the tuner 210a has tuned itself to receive the media content stream 112 having the newly selected media content event therein), the low to high resolution logic 232 manages a transition between the low resolution version to the now available high resolution version of the newly selected media content event so that the user is then presented the high resolution version of the newly selected media content event.

The processes performed by the media device 102 relating to the processing of the received media content stream 112 and communication of a presentable media content event to the components of the media presentation system 110 are generally implemented by the processor system 212 while executing the media device logic 226. Thus, the media device 102 may perform a variety of functions related to the processing and presentation of one or more media content events received in the media content stream 112.

At this juncture, various times referred to herein are defined. "Real time" is referred to herein as being actual clock time, such as provided by the National Institute of Standards and Technology (NIST) and U.S. Naval Observatory (USNO). The "broadcast time" is referred to herein as the time that a particular portion of a media content event is being broadcasted to the media device 102, and for convenience, refers to the time that the portion is broadcast out from the media transmit facility 104. The "scheduled broadcast" start and/or end times are the times that the content service provider intends that the beginning and ends of a particular media content will be broadcast, and typically refer to the time that the media device 102 may begin and end presentation of that particular media content event. The scheduled broadcast start and/or end time are typically predefined and reside in the stored EPG information 228 at the media device 102. "Presentation time" is the time that an image frame of the media content event is rendered and communicated to the components of the media content presentation system 110 for presentation to the user.

It is appreciated that even live TV (content presentation of an event as it is occurring in real time) does not truly correspond to real time. For example, consider a sporting event that is broadcast "live" to a plurality of viewing users. Consider the instant in real time that a player scores a point. An image capture device (a camera) is filming the sporting event, and at the instant in real time that the point is scored, the camera captures (films) a single still image (wherein a series of previously captured images and subsequently captured images create the moving picture effect of the sporting event). Some definable amount of time is required to process this still image into image data, transmit the image data from the camera to a communication device, and then transmit the image data from the communication device to the media transmit facility 104. Additional time is further required to process the image data for that single still image by the programming stream receive system 116 and the transport channel generation system 118. And, additional time is required to communicate the data (for that particular image frame generated from the captured still image) from the transport channel generation system 118, through the broadcast communication system 124, and to the media device 102. For example, in a satellite broadcast environment, the image frame must be communicated in the uplink signal 130 to the satellite 128, and then down to the media device 102 in the downlinked transponder signal 134. Then, the media device 102 must process the received signal having the image data, render the image data into an image frame (corresponding to the captured still image), communicate the image frame to components of the media content presentation system 110 where the still image is finally presented on the display 208 to the user. Thus, even though the user is viewing a "live" broadcast of the event as it is occurring in real time, the presentation time of the individual image frames of the video content for the sporting event is behind real time by a duration that corresponds to the sum of the times required to complete the above-described processes.

In practice, any particular image frame is assigned an arbitrary time reference number or indicia, commonly referred to as a presentation time stamp, that indicates the order of that particular image frame in the sequence of image frames of a media content event. Other relative time identifiers may also be associated with individual image frames and/or the media content event itself. For example, a frame identifier (frame ID) number may be assigned to each one of the series of image frames in a media content event. Another example may be a packet identifier (PID) number that identifies a particular communicated data packet that is communicated over the broadcast communication system 124 in a communicated data signal. These relative image frame identifiers are used to order the presentation sequence of the series of image frames when the video portion of a media content event is being presented. In the various embodiments, corresponding image frames of the low resolution version media content event and the high resolution version media content event have the same image frame identifier, or at least have their image frame identifiers associated with each other.

Figure 3:
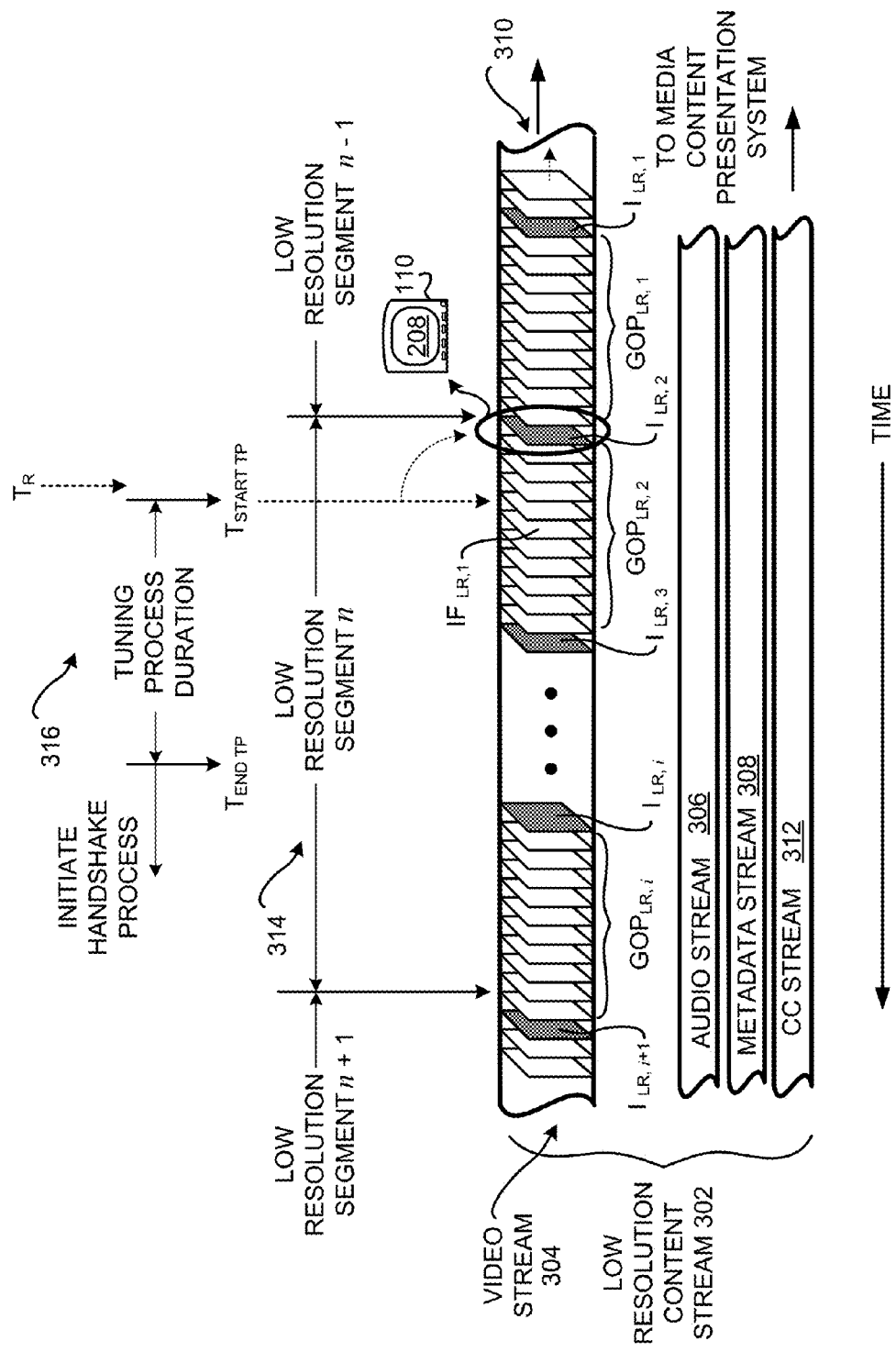
FIG. 3 conceptually illustrates a portion of a low resolution content stream 302 having a low resolution version of a streaming media content event.

FIG. 3 conceptually illustrates a portion of a low resolution content stream 302 having a low resolution version of a streaming media content event that is received at the media device 102. The low resolution version of a media content event is received as a low resolution content stream 304 from the MTF internet content manager 106 or the regional internet content manager 108 via the communication network 150. At any given moment, the media device 102 is receiving a plurality of different low resolution content streams 304.

The simplified conceptual example of the low resolution content stream 302 comprises a video stream 304, a corresponding audio stream 306, and a corresponding metadata stream 308. The video stream 304 is conceptually illustrated as comprising a plurality of serially sequenced video image frames 310. Each video image frame 310 has data or information used to render and present a particular image of the program of interest. The video image frames 310 are serially presented, each for a predefined duration, so as to create the perception of a moving picture to a viewing user. That is, the low resolution content stream 302 comprises a series of low resolution video image frames 310 that are serially presentable on a display to present a low resolution version of a media content event.

The audio stream 306 may include spoken words, music, and background sounds. The presentation of the audio stream 306 is sequenced with the presentation of the video image frames 310 such that spoken words, music, and background sounds of the audio stream 306 correspond in time with the moving picture. Some low resolution content streams 302 may include a metadata stream 308 which contains other information of interest, and more particularly, information that may be used by the low to high resolution logic 232 to manage a transition between the low resolution version to the available high resolution version of the newly selected media content event.

An optional closed captioning stream 312 is also conceptually illustrated as part of the low resolution content stream 302. The closed captioning stream 312 is typically a textual presentation of the words of the audio stream 306 for hearing impaired viewers or for viewers in an area with relatively loud ambient noise levels, such as a bar or the like. The words of the closed captioning stream 312 are sequenced so as to generally correspond to the spoken words of the audio stream 306.

The serially sequenced video image frames 310 may, in some media content formats, comprise different frame types, such as an I-frame (intra coded frame or slice), a P-frame (predicted frame of slice) and/or a B-frame bi-directional predicted frame or slice), that are compressible to different degrees. The I-frame is the least compressible type of image frame, but doesn't require other video image frames to decode. The P-frame may use data from previous I-frames to decompress, and is therefore more compressible than an I-frame. The B-frame can use both previous and forward frames for data reference to get the highest amount of data compression. Other compression techniques may be used to compress the images of the low resolution content stream 302 to facilitate communication to the media device 102.

As used herein, a complete video image frame corresponds to a substantially complete set of data or information that may be used, by itself, to generate an image on the display 208. In the simplified conceptual illustration in FIG. 3, a complete video image frame corresponds to the above-described I-frame. An I-frame is indicated in FIG. 3 using shading (denoted as the complete image frames $I_{LR,1}$, $I_{LR,1}$, $I_{LR,1}$ through $I_{LR,i+1}$). If other compression formats are used, such formats from time to time has data that corresponds to a complete video image frame.

In an example application, a plurality of image frames are grouped together, referred to in the arts as a group of pictures (GOP). In one example format, any particular GOP begins with an I-frame, and includes the subsequently following P-frames and/or B-frames. The next GOP begins with the next I-frame. Other media formats may use other types of image data formats and or other organizational schemes. The above-described scheme of grouping images facilitates a conceptual discussion of the operation of some embodiments of the fast channel change system 100. Any suitable number of image frames may be included in a GOP.

The above-described types of image frames and/or grouping of image frames into a GOP are equally applicable to the data of high resolution media content events received in the media content stream 112 (FIGS. 1 and 2) and the low resolution version media content events received from the MTF internet content manager 106 or the regional internet content manager 108. However, in some embodiments and/or implementations, the high resolution version media content events and the low resolution version media content events may use different types and/or formats of image frames and/or GOPs.

In the various embodiments, a plurality of low resolution content streams 302 are received at the media device 102 from the MTF internet content manager 106 and/or the regional internet content manager 108. Each low resolution content stream 302 is segmented by the fast channel change system 100 into relatively small content portions, such as the example low resolution segment n. Each low resolution segment n is a group of adjacent ones of the series of low resolution video image frames 310 received in the low resolution content stream 302. Each low resolution segment n spans a predefined amount of presentation time, defined herein as a segment duration. The segmentation may be performed at the media device 102 as the low resolution content streams 302 are being received. In FIG. 3, the low resolution segment n is preceded by the previously received low resolution segment n−1. The low resolution segment n is followed by the next received low resolution segment n+1.

The low resolution segments n are saved into the low resolution content 234 portion of the memory 214 (or into another suitable memory medium, such as in the program buffer 216, for example). The storage location of each low resolution segment n in the storage medium (such as the low resolution content 234 portion of the memory 214) is determinable. In some embodiments, pointers or the like may be defined to denote the memory address locations for the start and end of each low resolution segment n. Thus, if any particular low resolution segment n is needed for presentation, that particular low resolution segment n can be retrieved based on its known location in the storage medium. Any suitable file management system may be used in the various embodiments to track the storage location of the stored low resolution segments n.

Alternatively, or additionally, the segmentation of the low resolution content streams 302 may be performed at the MTF internet content manager 106 or the regional internet content manager 108 prior to communication to the individual media devices 102. Accordingly, markers or other identifiers may be added into the low resolution content stream 302 to identify or denote transitions for one low resolution segment n to the next low resolution segment n+1, for example. Since individual video image frames are identifiable, individual video image frame identifiers can be used to identify transitions between the low resolution segments n, and/or the end and beginnings of the low resolution segments n. GOPs may also have identifiers, so a low resolution segment n may be identified using one or more GOP identifiers.

The corresponding audio stream 306, metadata stream 308, and optional closed captioning stream 312 are also segmented into corresponding portions and are optionally included as part of the corresponding low resolution segment n. (Alternatively, the segmented portions of the audio stream 306, metadata stream 308, and optional closed captioning stream 312 may be separately processed similar to the processing of the video image frames of the low resolution segment n.)

Each low resolution segment n has a determinable segment duration, as indicated by the segment duration 314. Since any single image frame is presented on the display 208 for a predetermined period of time (duration), the duration of a low resolution segment n is the sum of the number of image frames of the low resolution segment n times the presentation duration of each individual image frame. Further, the amount of data and/or number of image frames of a low resolution segment n is relatively small to facilitate data management operations at the media device 102.

As noted herein, each low resolution segment n is saved at the media device 102. If the low resolution segment n is needed for presentation, that particular low resolution segment n can be retrieved and presented. When a low resolution segment n is no longer needed for presentation, that particular low resolution segment n is erased, deleted, overwritten or otherwise discarded. The benefit of using relatively small low resolution segments n that are erased, deleted, overwritten or otherwise discarded when no longer needed is that many individual low resolution segments n may be saved in a relatively small region of the memory 214 (or in another suitable memory medium).

In the various embodiments, at any given moment, many different low resolution segments n, each associated with a different broadcasting media content or channel, are concurrently received and saved in a media device 102. When a particular channel or media content event is selected by the user for presentation, that particular low resolution segment n for the newly selected media content event or channel is immediately, or nearly immediately, retrieved and presented to the user. By segmenting the received low resolution content stream 302 into low resolution segments n, a very recently received duration of the low resolution segment for any particular media content event is always available for this presentation process. That is, any particular low resolution segment n can be retrieved and immediately presented (or nearly immediately in view of processing time required to access and render the stored media content data) to the user on the display 208.

Once a broadcast portion of a media content event has been broadcast, then the corresponding low resolution segment n is no longer needed for a fast channel change operation (since that portion of the broadcast has already been transmitted to the media devices 102, and is therefore no longer needed). Accordingly, when a previously received low resolution segment n is no longer needed, such as the previously received low resolution segment n−1 illustrated in FIG. 3, that particular low resolution segment n−1 may be erased, deleted, overwritten or otherwise discarded.

Summarizing, at any given moment in time, the utilized memory storage capacity for each stored low resolution video information for any single channel of media content (which is presenting a single media content event) is relatively small. That is, the amount of data storage capacity required to store a single channel of media content corresponds to the number of image frames in a low resolution segment n. By only storing the current relatively small low resolution segments n, embodiments of the fast channel change system 100 are able to store a relatively large number of low resolution segments n for a large number of different media content events or channels using a relatively small portion of the storage capacity of the memory 214 (or in another suitable memory medium). That is, the memory capacity required to store many different low resolution segments n, each associated with a different media content event or channel that the user might wish to select, is relatively small.

For example, if one hundred different media content events (each received in a different channel) are to be available for a fast channel operation, and each low resolution segment n has a segment duration of only three seconds which are saved, then the total duration of saved low resolution content is approximately three hundred seconds (or five minutes of stored low resolution content). (The low resolution content may be saved as either as a single low resolution segment n, two low resolution segments n, or even three low resolution segments n) To illustrate, hypothetically, if the low resolution content requires one-fifth the amount of low resolution data of the high resolution version of the same media content, then these one hundred seconds of low resolution content will utilize approximately the same amount of memory capacity as twenty seconds of high resolution content. It is appreciated that many memory mediums used by a media device 102 are configured to store one or more hours of high resolution media content. Accordingly, embodiments of the fast channel change system 100 may be easily configured to store any desired number of, even thousands of, different channels of low resolution version media content.

FIG. 3 conceptually illustrates a tuning process duration 316 where the media device 102 performs the tuning process to receive the high resolution version of the newly specified media content event. The tuning process duration 316 is defined by a tuning process start time ($T_{start\ TP}$) and a tuning process end time ($T_{end\ TP}$). The tuning process duration start time begins in response to the user specifying a new media content event of interest for presentation by the media device 102 (such as during a channel change initiated by the user). Accordingly, at some time during operation of the media device 102 [denoted as the real time ($T_R$)], the media device 102 receives a user command to change channels (or a command to present a new media content event of interest).

In response to receiving the command to change channels (or a command to present a new media content event of interest), embodiments of the fast channel change system 100 concurrently perform two processes. The first process is the channel change process, wherein the media device 102 operates to tune one of its tuners 210a (FIG. 2) to receive the media content stream 112 having the specified channel and/or the specified new media content event of interest.

The tuning process is initiated at the start time ($T_{start\ TP}$). The start time ($T_{start\ TP}$) is conceptually illustrated as occurring shortly after the user command is received at the time $T_R$ since some small amount of time is required for the processor system 212 to respond to the received user command.

The tuning process requires some amount of time to complete, referred to herein as the tuning process duration 316. At the end of the tuning process duration ($T_{end\ TP}$), the high resolution version of the new media content event of interest will then be available for presentation (although the low resolution version of the new media content event of interest is being presented at that time). That is, once the tuner 210a is receiving the media content stream 112, and the processor system 212 has parsed out the individual high resolution image frames and stored them in the program buffer 216 so that they are available for transmission to the components of the media content presentation system 110 via the presentation device interface 220. That is, the high resolution version of the newly selected media content event is then available for presentation after the conclusion of the tuning process.

Concurrently, while the tuning process is occurring, embodiments of the fast channel change system 100 access and retrieve the stored low resolution version of the new media content event of interest. The retrieved low resolution version may be immediately (or nearly immediately) presented to the user as the processor system 212 is responding to the user command. That is, because prior to the start the tuning process (or very close thereto) the low resolution version of the newly selected media content event has already been received and stored at the media device 102, the current low resolution segment n associated with the newly selected media content event can be accessed for presentation. The low resolution version of the new media content event of interest includes sufficient detail so as to be pleasing to the viewing user. That is, the low resolution version images presented on the display 208 have sufficient resolution and quality to be acceptable to the user.

In the simplified hypothetical example illustrated in FIG. 3, the fast channel change system 100 retrieves the image frame that is closest to real time (or the time that the user initiated the channel change to the new media content event of interest), here conceptually illustrated as the low resolution image frame $IF_{LR,2}$. The low resolution media content event, beginning with the first retrieved image frame, is then transmitted to the components of the media content presentation system 110, via the presentation device interface 220.

Here, the data of the first I-frame in the currently stored low resolution segment n (denoted as $I_{LR,2}$) is the first retrieved and presented image frame. I-frames are preferably initially retrieved since an I-frame contains all of the image data necessary to render and present a complete image frame on the display 208. If other compressed image frames are used to start presentation of the low resolution media content, additional processing may be required to construct the complete image data for that selected frame. Thus, a preferred embodiment initiates presentation of the low resolution media content using an I-frame, though alternative embodiments may use any selected stored image frame.

Subsequent low resolution image frames are then accessed and presented to the user. Thus, the user is presented the low resolution video portion of the new media content event of interest while the tuning process is occurring.

It is appreciated that since the user has not yet viewed any of the requested new media content event of interest, presentation of the low resolution version of the new media content event of interest may begin with presentation time that is relatively close in time to the actual real time. In an embodiment that initially accesses a previously received and stored I-frame in response to receiving user selection of a new media content event or new channel, the actual initial presentation time of the first image frame of the low resolution media content will only be ahead of real time by a few milliseconds. Here, accessing an already received and stored first image frame that is ahead of real time provides an unexpected benefit in that corresponding image frames of the high resolution media content event will be a few milliseconds behind in time with respect to the stored low resolution version media content event. This time separation between the low resolution image frames and the high resolution image frames facilitate the handshake process (wherein presentation of the newly selected media content event transitions from the low resolution version to the high resolution version). In a preferred embodiment, the actual initial presentation time of the low resolution media content will at most be ahead of real time by the duration of one GOP in a preferred embodiments since I-frames are a preferred starting point in the accessing and the rendering of stored image data.

Depending upon the actual time of the receipt of the channel change command specifying the new media content event of interest, embodiments may initiate presentation of the low resolution media content using any suitable image frame that has been previously stored in the low resolution segment n. For example, if the actual time of the receipt of the channel change command occurs after the I-frame $I_{LR3}$, for example, presentation of the low resolution media content may start with the I-frame $I_{LR3}$ or another image frame of the associated group of pictures (GOP).

Some embodiments may access and render any selected frame to begin presentation of the low resolution version of the newly selected media content event. If a non-I-frame is selected for initial presentation, the data of one or more other image frames may have to be accessed to render the selected image frame. Though not as computationally efficient as initially selecting an I-frame, selecting another frame may be satisfactory.

In practice, it is appreciated that the entirety of the low resolution segment n being used to present the low resolution media content event may not have been received at the media device 102. For example, the image frames of the last group of pictures ($GOP_{LR,j}$) may not have yet been received by the media device 102 from the MTF internet content manager 106 or the regional internet content manager 108. However, these subsequent low resolution image frames will be received at the media device 102 sufficiently in advance of their actual presentation time to the user. Thus, these later received low resolution image frames are simply stored in a suitable memory medium, such as in the low resolution content 234 or the program buffer 216. The later received image frames may then be retrieved and rendered as needed during presentation of the low resolution version media content event.

Further, as the video image frames of the low resolution media content event are being presented, the corresponding audio portion is concurrently presented so that the user hears the synchronized dialogue and sound track of the presented low resolution media content. In some embodiments, the presented audio content is the same as the corresponding audio content used in the high resolution media content. In other embodiments, the amount of audio data included with the low resolution media content may be reduced. For example, the audio of the high resolution media content may have multiple channels (such as, but not limited to Dolby surround sound channels) and the audio of the low resolution media content may have only two channel (stereo) of audio content.

In some embodiments, a low resolution segment n may optionally include the associated closed captioning stream 312 portion. Thus, closed captioning text may be presented to the user while the low resolution video content is being presented.

In some embodiments, each of the low resolution segments n optionally include the associated metadata stream 308 portion. The metadata information may include information that is used to facilitate the handshake process whereby presentation of the low resolution media content is transitioned to presentation of the high resolution media content.

Returning to the simplified conceptual example of FIG. 3, it is appreciated that the previously stored low resolution segment n−1 has been previously deleted, erased, overwritten or otherwise discarded prior to receiving the command to change channels to a new media content event of interest. Further, it is appreciated that it is probable that the next low resolution segment n+1 has not yet been received from the MTF internet content manager 106 or the regional internet content manager 108.

In some situations, the command to change channels to a new media content event of interest may be received at a time that is near the end of receipt of the low resolution segment n such that the tuning process will conclude at some point in time after the beginning of the next received (or defined) low resolution segment n+1. In such situations, presentation of the low resolution media content continues using image frames of the next low resolution segment n+1 (as they are being received at the media device 102) until the handshake process can be completed (wherein presentation transitions from the low resolution version to the high resolution version of the newly selected media content event).

In some embodiments, while a low resolution segment n is currently being received from the MTF internet content manager 106 or the regional internet content manager 108, the previously received low resolution segment n−1 is retained for some brief duration of time (such as the duration of one GOP). Thus, by saving the previously received low resolution segment n−1 for some brief duration, at least one complete I-frame will be available (from the previously received low resolution segment n−1) to initiate presentation of the low resolution media content to the user. The previously received low resolution segment n−1 may then be erased, deleted, overwritten or otherwise discarded after a sufficient portion of the current low resolution segment n has been received. Here, the embodiment may erase, delete, overwrite or otherwise discard the previously received low resolution segment n−1 after an I-frame or the like in the low resolution segment n has been received and saved (presumably prior to receiving the command to change channels to a new media content event of interest). That is, the previously received low resolution segment n−1 may then be erased, deleted, overwritten or otherwise discarded in response to detecting an I-frame in the current low resolution segment n.

In some embodiments, the previously received low resolution segment n−1 is saved until the entirety of the low resolution segment n has been received. Here, when an end of a particular low resolution segment n is identified or received, the previously received low resolution segment n−1 may then be erased, deleted, overwritten or otherwise discarded in response to detecting the end of the current low resolution segment n. The start and end of the previously received low resolution segment n−1 is readily determinable, and thus facilitates the process of erasing, deleting, overwriting or otherwise discarding of that particular low resolution segment n−1. Such an embodiment may be more computationally efficient to implement since transition between low resolution segments n are readily determinable, particularly when hundreds of, or even thousands of, different channels of low resolution media content is being concurrently processed.

Some embodiments may be configured to define a low resolution segment n using one or more GOPs. For example, if at least one GOP is saved while a next GOP is being received from the MTF internet content manager 106 or the regional internet content manager 108, then at least one complete I-frame will be available to initiate presentation of the low resolution media content to the user. Once the currently received GOP has been received and saved in its entirety, the previously saved GOP may be erased, deleted, overwritten or otherwise discarded.

Figure 4:
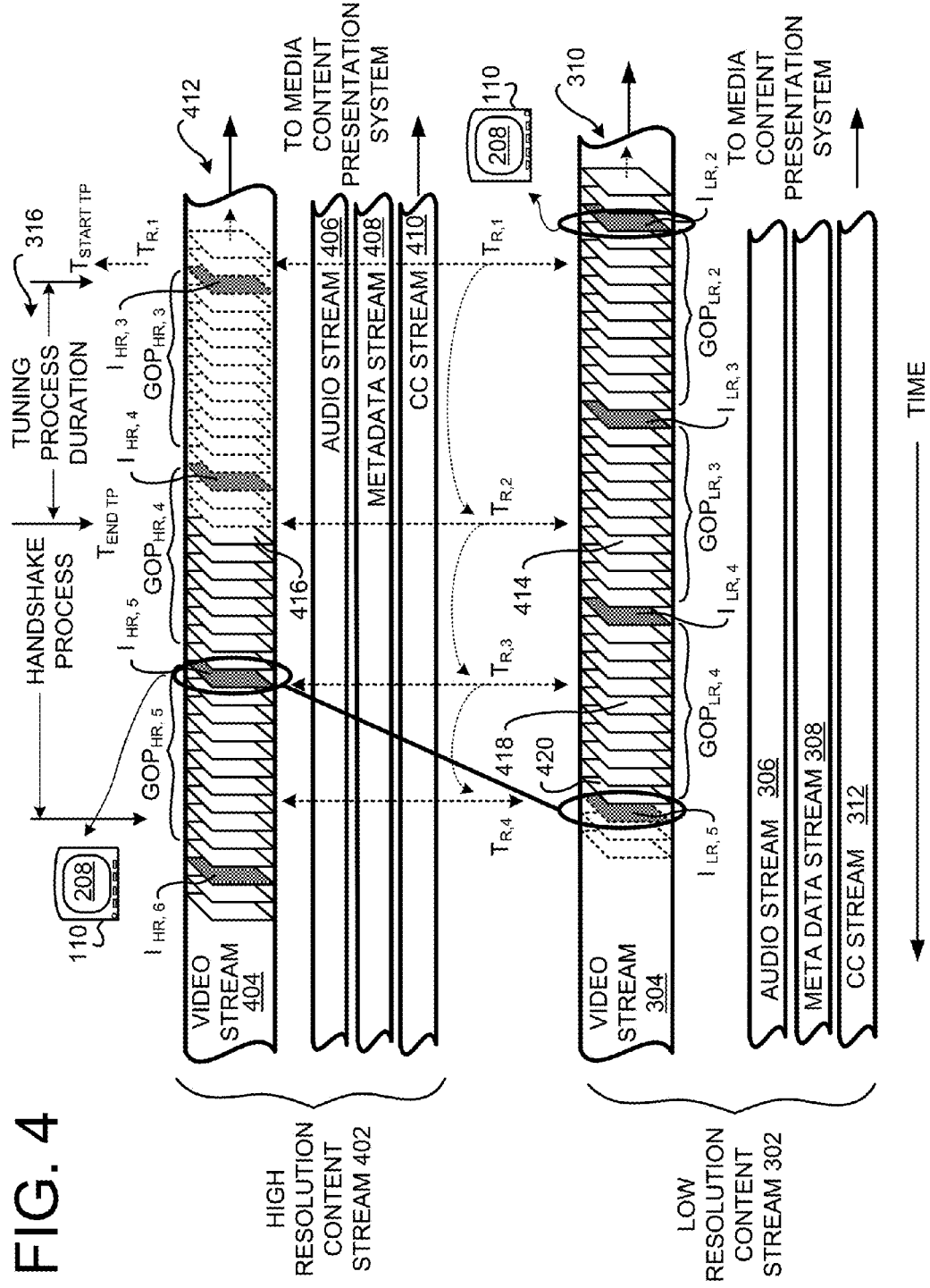
FIG. 4 conceptually illustrates a portion of a low resolution content stream and a corresponding portion of a high resolution content stream being received at the media device.

FIG. 4 conceptually illustrates a portion of a low resolution content stream 302 and a corresponding portion of a high resolution content stream 402 being received at the media device 102. The low resolution content stream 302 and the high resolution content stream 402 are shown adjacent to each other to conceptually illustrate their receipt and processing along a common time frame.

The high resolution content stream 402 is conceptually illustrated as comprising a video stream 404, an audio stream 406, an optional metadata stream 408, and an optional closed captioning (CC) stream 410. The video stream 404 is conceptually illustrated as a series of high resolution image frames 412. Each high resolution image frame 412 comprises data sufficient to generate and render a complete high resolution image frame that is presentable on the display 208. In practice, the high resolution content stream 402 may be configured to include any type of high resolution image data, such as standard definition content, high definition content, or the like.

Here, the low resolution content stream 302 is being received from the MTF internet content manager 106 or the regional internet content manager 108. The low resolution content stream 302, conceptually illustrated as a stream of low resolution image frames 310, is being processed into the low resolution segments n (not shown) and stored into the low resolution content 234 portion of the memory 214 (or is being stored into another suitable memory medium). As noted hereinabove, the audio stream 306 is also being received, processed into segments, and saved (and optionally the metadata stream 308 and the closed captioning stream 312). In the various embodiments, hundreds of, or even thousands of, different channels of low resolution media content streams 302 are being concurrently processed into segments and stored by the media device 102. The above-described segmentation of the low resolution content stream 302 in the series of low resolution segments n is not illustrated in FIG. 4. However, the above-described segmentation process of the low resolution content stream 302 into the low resolution segments n is occurring to facilitate data storage and processing management of the low resolution content stream 302.

To conceptually illustrate operation of embodiments of the fast channel change system 100, assume that a user command to change to a new media content event of interest or a new channel is received at the first real time $T_{R,1}$ (which also corresponds to the real time $T_R$ of FIG. 3). At some very short duration after the user command is received at the first real time $T_{R,1}$, the tuning process is initiated (denoted as occurring at the time $T_{START\ TP}$, and as also illustrated in FIG. 3).

In practice, the high resolution content stream 402 is being broadcast to the media device 102 along with hundreds of, or even thousands of, other high resolution content streams (not shown). Thus, it is appreciated at the first real time $T_{R,1}$ when the user command is initially received, the tuner 210a (FIG. 2) is most likely not currently tuned to the particular media content stream 112 having the selected channel with the new media content event of interest. That is, the media content (image data, audio data, metadata, and closed captioning data) of the high resolution content stream 402 received at the antenna 136 is not yet being processed by the media device 102. (Rather, the media device 102 is processing and presenting the high resolution content stream that is being presented to the user prior to the time that the user command is received). To illustrate that this data is not yet being received and/or processed, the image frames of this period are conceptually illustrated in FIG. 4 using dashed lines. That is, the dashed-lined image frames 412 are appreciated as not yet being processed by the media device 102 so as to be available for presentation.

As described herein, some amount of time is required to for the media device 102 to complete the tuning process (denoted as the tuning process duration 316). At the conclusion of the tuning process duration 316 (denoted as occurring at the time $T_{END\ TP}$, and as also illustrated in FIG. 3), the high resolution content stream 402 is then available for presentation to the user (noting that the low resolution content stream 302 is currently being presented to the user). To conceptually illustrate that the high resolution content stream 402 is now available for presentation, the image frames of the high resolution content stream 402 are now illustrated using a solid line.

The end of the tuning process duration 316 is illustrated as occurring at the second real time $T_{R,2}$ (which coincides with the send time $T_{END\ TP}$) At the second real time $T_{R,2}$, the low resolution image frame 414 is the next image frame that is presented on the display 208 to the user. The now currently available high resolution image frame 416 is not the next image frame that will be presented since some amount of time will be required to effect a transition process from the low resolution content stream 304 to the high resolution content stream 402. At this juncture, the handshake process may be initiated (since the image frames 412 of the high resolution content stream 402 are now available).

Several important characteristics of the sequence of high resolution image frames 412 and the low resolution video image frames 310 become apparent upon inspection of FIG. 4. First, in the hypothetical example of FIG. 4, the first image frame that is presented to the user is the closest available low resolution I-frame (here, $I_{LR,2}$) that was received and stored prior to the first real time $T_{R,1}$ (that the channel change command was received). This low resolution I-frame ($I_{LR,2}$) is conceptually illustrated as being in the low resolution second group of pictures $GOP_{LR,2}$. This particular low resolution image frame is available for presentation since this image frame has already been received at and stored by the media device 102. Presentation then continues with the remaining image frames of the low resolution second group of pictures $GOP_{LR,2}$, and so on, until the handshake process has been completed (such that the high resolution content stream 402 is then presented).

As a second point, the low resolution content stream 302 illustrated in FIG. 4 is shown in terms of its presentation time. In some embodiments, the presentation time of the low resolution content stream 302 may substantially correspond to the time that the low resolution content stream 302 is received from one of the MTF internet content manager 106 or the regional internet content manager 108. However, in some embodiments, the low resolution content stream 302 may have been received at some prior time and stored at the media device 102.

As a third point, the presentation times of the low resolution image frames 310 are occurring ahead of the real time that the corresponding high resolution image frames 412 are being received at the media device 102. For example, the low resolution second group of pictures $GOP_{LR,2}$ is being presented while the high resolution third group of pictures $GOP_{HR,3}$ is being broadcast to the media device 102. Accordingly, the media device 102 continues presenting the next one of the plurality of low resolution segments after the initially retrieved low resolution segment has been presented on the display 208 if the media device 102 is not yet done tuning to the broadcasted high resolution content stream 402. The process of continuing presentation of the next one of the plurality of low resolution segments continues as long a needed for the handshake process to be completed.

The reason that the presentation time of the example low resolution image frames 310 is in advance of the broadcast times of the corresponding high resolution image frames 412 is due to the handshake process. An example handshake process is initiated after the conclusion of the tuning process duration 316. As data of the high resolution image frames 412 is being received and processed, the fast channel change system 100 identifies and selects a particular high resolution image frame to be the first high resolution image frame that is presented to the user, referred to herein as the transition high resolution image frame. The transition high resolution image frame is identifiable by a unique identifier.

Once identified, the transition high resolution image frame is buffered or stored in a suitable memory medium, such as the program buffer 216 (FIG. 2). Later received and processes high resolution image frames 412 are buffered behind the identified transition high resolution image frame. In a preferred embodiment, the transition high resolution image frame is an I-frame from which an entire image can be rendered. However, in alternative embodiments, any identifiable high resolution image frame 412 may be selected as the transition high resolution image frame.

Once the transition high resolution image frame is identified, the fast channel change system 100 monitors the identifiers of the low resolution image frames 310 that are being presented to the user. At some point, a presented low resolution image frame 310 will correspond to the same image of the identified transition high resolution image frame. That is, the image content of the identified low resolution image will be the same as the image content of the transition high resolution image frame.

In an example embodiment, the low resolution image frames 310 uses the same identifiers as the corresponding ones of the high resolution image frames 412. Therefore, the identifier of the selected transition high resolution image frame will have the same identifier as the corresponding low resolution image frame 310.

Just before the low resolution image frame 310 corresponding to the transition high resolution image frame is to be presented, the transition process is effected wherein presentation transitions from the low resolution content stream 302 to the high resolution content stream 402. Here, the low resolution image frame 310 corresponding to the transition high resolution image frame is not presented. Instead, the transition high resolution image frame is presented. Presentation continues using the buffered high resolution image frames 412 that follow the presented transition high resolution image frame.

FIG. 4 conceptually illustrates that the fast channel change system 100 has identified the high resolution I-frame $I_{HR,5}$ as being a suitable transition high resolution image frame. This identification of the transition high resolution image frame is illustrated as occurring at real time $T_{R,3}$. However, the corresponding low resolution image frame 418 is currently being presented at the illustrated third real time $T_{R,3}$.

At some later fourth real time $T_{R,4}$, the corresponding low resolution image frame $I_{LR,5}$ will be a next frame in the series of presented low resolution image frames 310. For example, after the last low resolution image frame 420 is presented, the next image frame to be presented is the low resolution image frame $I_{LR,5}$ (corresponding to the transition high resolution image frame $H_{LR,5}$). To effect the handshake process, the low resolution image frame $I_{LR,5}$ is not presented after presentation of the previous low resolution image frame 420. Rather, presentation transitions to the high resolution content stream 402 wherein the transition high resolution image frame $H_{LR,5}$ is presented after presentation of the low resolution image frame 420.

As a fourth point of note in FIG. 4, the individual high resolution image frames 412 are preferably broadcast ahead of presentation of the corresponding low resolution image frames 310 by some amount of time (illustrated in FIG. 4 as the duration between the third real time $T_{R,3}$ and the fourth real time $T_{R,4}$). This amount of time between broadcast of the high resolution image frames 412 and presentation of the corresponding low resolution image frames 310 is referred to herein as a "presentation delay duration." The presentation delay duration provides a sufficient amount of time for the fast channel change system 100 to identify a candidate one of the high resolution image frames 412 as being a suitable transition high resolution image frame, and time to monitor presented low resolution image frames 310 to identify the corresponding low resolution image frame 310 that corresponds to the selected transition high resolution image frame.

The minimum amount of the presentation delay duration may be determined or estimated based on processing time required by the media device 102. Any suitable presentation delay duration may be used by the various embodiments of the fast channel change system 100. In the conceptual illustrative example of FIG. 4, the low resolution image frame 420 (the last presented low image frame) is five frames behind the low resolution image frame 418 that was being presented at the time the transition high resolution image frame (here $I_{HR,5}$) was identified. The difference between the presentation times of the media content of the content streams 302/402 and actual "live" time is very short, and is more likely than not imperceptible to a user. Thus, embodiments of the fast channel change system 100 are suitable for presentation of live broadcast events, such as a sporting event or the like.

It is appreciated that if the high resolution image frames 412 are broadcast behind presentation of the corresponding low resolution image frames 310, a presentation delay process must be used to delay (slow down) presentation of the low resolution content stream 302 for a successful handshake (transition from the low resolution content stream 302 to the high resolution content stream 402) to occur. In an example embodiment, the presentation duration of each presented low resolution image frames 310 may be slightly increased. Over time, presentation of subsequent low resolution image frames 310 will be delayed until the minimum presentation delay duration is reached. Alternatively, or additionally, one or more selected low resolution image frames 310 may be duplicated and presented after its corresponding low resolution image frame 310. Each duplicated and presented one of the low resolution image frames 310 will add a delay to presentation of subsequent low resolution image frames 310.

Further, if a particular high resolution image frame 412 is identified as being a suitable candidate transition high resolution image frame, and if the presentation delay duration is not sufficient to provide for a successful handshake transition, then another later broadcast one of the high resolution image frames 412 may be selected as a next transition high resolution image frame. Thus, additional presentation time of the low resolution content stream 302 may be added as needed (slow down and/or delay presentation of the low resolution content stream 302) so as to increase the presentation delay duration to a minimum threshold duration that is necessary for a successful handshake transition.

It is appreciated that the time delay for communication of low resolution content streams 302 from the MTF internet content manager 106 or the regional internet content manager 108 to any particular media device 102 may vary. Node distances and the number of communication hops may over the communication network 150 vary between media devices 102 and the MTF internet content manager 106 or the regional internet content manager 108. Data communication traffic over the communication network 150 may vary throughout the day such that longer periods of time are required to communicate the low resolution content streams 302 over the communication network 150.

In an example embodiment, a media device 102 is configured to determine the delay time in communication of the low resolution content streams 302. This determined delay time is communicated to the MTF internet content manager 106 or the regional internet content manager 108. Alternatively, the MTF internet content manager 106 or the regional internet content manager 108 may determine the delay times. The determined delay times may then be used to determine the output timing of the low resolution content stream 302 to the media devices 102, or even to individual media devices 102.

In some applications, the low resolution content streams 302 are broadcast out from the MTF internet content manager 106 and/or the regional internet content managers 108 based on a predefined duration that is in advance of the broadcast time of the corresponding high resolution content streams 402. The various media devices 102 may then pick out those low resolution content streams 302 of interest, or all of the low resolution content streams 302, as they are being communicated out from the MTF internet content manager 106 or the regional internet content manager 108 onto the communication network 150.

Alternatively, or additionally, individual media devices 102 may specify which particular ones of the low resolution content streams 302 that they wish to receive. The specification is communicated to the MTF internet content manager 106 or the regional internet content manager 108. The specified low resolution content streams 302 are then communicated from the MTF internet content manager 106 or the regional internet content manager 108 to the requesting media devices 102.

In practice, a particular media content event may be shown at different times across an expansive geographic area. For example, the United States spans four different time zones. Thus, a newscast, a serial program, or the like may be broadcast at the same time in each of the different time zones. Thus, a particular media content event may be broadcast as many as four different times (once of reach time zone, for example). However, providing each media device 102 in the United States a low resolution content stream 302 at the same time may not be practical (since some media devices 102 may have to save the low resolution content stream 302 for up to three hours). Thus, the low resolution content stream 302 version of a broadcasting high resolution content stream 402 may be timed to be available from the regional internet content manager 108 located in that particular time zone. (Alternatively, the low resolution content stream 302 may be available from the MTF internet content manager 106 for different times such that the media devices 102 in a particular time zone can selectively receive that particular low resolution content stream 302 at the time that the corresponding high resolution content stream 402 is being broadcast for that particular time zone.)

In the various embodiments, any particular media device 102 may receive many different low resolution content streams 302 from the MTF internet content manager 106 or the regional internet content manager 108. However, different media devices 102 may be configured to selectively save fewer numbers of the low resolution content streams 302.

One factor that may impact the number of low resolution content streams 302 that can be received, processed, and saved is the amount of memory capacity that is available for storage of the plurality of low resolution segments n. For example, one media device 102 may have sufficient capacity to store ten thousand different low resolution segments n, and thus be able to receive ten thousand different channels of low resolution content (or five thousand different channels of low resolution content if two low resolution segments n are to be saved for each low resolution content stream 302). Such a media device 102 may have the ability to save the low resolution segments n for every possible broadcast channel of media content. Thus, the fast channel process may be used for any channel that the user selects.

On the other hand, another media device 102 may only have sufficient memory capacity to store ten channels of low resolution content. Accordingly, the fast channel process may be used for any ten predefined channels. If the user changes channels to one of those ten channels, then the fast channel change operation will be available. If another channel is selected, the conventional channel change process must be used.

Another factor that may impact the number of low resolution content streams 302 that can be received and processed is the bandwidth transfer capacity that is available from the low resolution content interface 224 (FIG. 2) and/or over the communication network 150. For example, one media device 102 may have sufficient bandwidth to receive ten thousand different low resolution content streams 302. Such a media device 102 would then have the ability to save the low resolution segments n for every possible broadcast channel of media content, or at least up to ten thousand channels. Thus, the fast channel process may be used for any channel that the uses selects.

However, if the low resolution content interface 224 has a low bandwidth capacity at the low resolution content interface 224 and/or over the communication network 150, then that particular media device 102 may be limited to storing the low resolution segments n for ten predefined channels. As another example, it is appreciated that bandwidth over the communication network 150 can vary as a function of overall network use. That is, there may be times when bandwidth availability becomes restricted if other users of the communication network 150 are simultaneously using the communication network 150 or other purposes. That is, network traffic can reduce the number of low resolution content streams 302 that can be received by the media device 102.

Yet another factor may be the number of different ones of the MTF internet content manager 106 or the regional internet content manager 108 that the media device 102 may communicatively couple to. For example, the media device 102 may be only able to communicatively couple to one of the MTF internet content manager 106 or the regional internet content manager 108 at a time. Thus low resolution content streams 302 not provided by the connected-to one of the MTF internet content manager 106 or the regional internet content manager 108 would not be available for a fast channel change.

In situations wherein the number of low resolution content streams 302 is restricted in some manner, embodiments of the fast channel change system 100 may be optionally configured to predefine which particular ones of the available low resolution content streams 302 will be accessed. The predefined low resolution content streams 302 are then processed for the predefined fast change channels so that the associated low resolution segments n are available for a fast channel operation. If another channel is selected, the conventional channel change process must be used.

An example embodiment includes a learning algorithm in the low to high resolution logic 232 (or in other logic) that is configured to identify favorite user channels that the user is more likely to change channels to during user of the media device 102. For example, the most frequently watched channels may be identified as being one of the predefined fast change channels for that particular media device 102. Then, the corresponding low resolution content streams 302 may be accessed from the MTF internet content manager 106 or the regional internet content manager 108.

Alternatively, or additionally, the media device 102 may be configured to permit the user to specify one or more channels that are to be used as a predefined fast change channel. Typically, the user would select channels that they wish to have the fast channel operation performed for in the event that they choose to change to one of those user specified channels. An interactive graphical user interface (GUI) may be presented for the user to specify a channel for designation as a predefined fast change channel. Alternatively, or additionally, the user selection may be made via a presented EPG. Alternatively or additionally, the user selection may be made in response to user actuation of one or more of the controllers 236 of the remote control 234 that have been configured to receive the user selection of a particular channel.

Alternatively, or additionally, the media content provider operating the media transmit facility 104 may select one or more channels that the low resolution content stream 302 will be available from the MTF internet content manager 106 or the regional internet content manager 108. For example, the media content provider may select those channels that are generally the most popular. Alternatively, or additionally, the media content provider may select particular media content events that are to have available corresponding low resolution content stream 302. For example, a widely popular serial media content event may be presented on one particular channel, followed by a subsequent media content event with a lower ratings (that is, the subsequent media content event is known to be less popular). In this scenario, the low resolution content stream 302 for the popular media content event may be available so that fast channel changes to that media content event are available at all media devices 102 provisioned with embodiments of the fast channel change system 100. Afterwards, fast channel change would not be available for the later scheduled program broadcast (since no corresponding low resolution content stream 302 is being provided for that low ratings media content event).

As noted above, embodiments of the fast channel change system 100 perform the handshake (a transition from presentation of the low resolution content stream 302 to the high resolution content stream 402) when the identifier of a selected transition high resolution image frame and the identifier of a corresponding low resolution image frame 310 match. In embodiments where the identifiers of the high resolution image frames 412 and the low resolution image frames 310 are the same, the matching frame identifiers will be the same.

However, the identifiers of the high resolution image frames 412 and the low resolution image frames 310 do not need to be identical. For example, during the processing of the high resolution content into low resolution content, new frame identifiers may be generated for the generated low resolution image frames 310. Here, the fast channel change system 100 uses a relational database or the like that has information that relates the identifiers of the high resolution image frames 412 to the identifiers of the low resolution image frames 310. Thus, the matching process portion of the handshake is based on comparison of the identifiers and their relationship as defined in the relational database. For example, a transition high resolution image frame may have "123456" as its frame identifier. The relational database may indicate that the identifier "123456" is related to the identifier "abcdef" of a low resolution image frame. Thus, the fast channel change system 100 monitors the low resolution image frames for the low image resolution frame with the "abcdef" identifier during the handshake process.

Other identifiers may be used to identify high resolution image frames 412 and low resolution image frames 310 during the handshake process. An example identifier that may be used is a PID that is associated with the image frames.

A presentation time stamp (PTS) associated with each image frame may be used by some embodiments. The PTS identifies a relative presentation time of each image frame with respect to some reference point in the media content event, such as it beginning.

Additional optional transport fields, as signaled in the optional adaptation field, may be used to identify image frames. Other information that may reside in the metadata file information may be used to identify image frames. Any suitable identifying information may be used so long as a presented low resolution image frame 310 can be associated with a corresponding transition high resolution image frame.

It should be emphasized that the above-described embodiments of the fast channel change system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for presenting media content, the method comprising:

receiving a low resolution version of each of a plurality of media content events at a media device that is one of a plurality of media devices that are each operable to receive a plurality of high resolution version media content events that are broadcast to the plurality of media devices via a broadcast communication system, wherein each of the plurality of low resolution version media content events corresponds to one of the broadcasting plurality of high resolution version media content events, and wherein the low resolution version of each one of the media content events is received in a low resolution content stream via a communication network;

segmenting each of the plurality of low resolution version media content events received in the low resolution content stream into a plurality of low resolution segments, wherein each of the plurality of low resolution segments includes a portion which corresponds to a currently broadcasting portion of the corresponding high resolution version media content event;

storing, in a memory of the media device, each one of the plurality of low resolution segments;

deleting a previously stored low resolution segment from the memory of the media device as a next one of the plurality of low resolution segments is stored such that the plurality of low resolution segments currently stored in the memory of the media device includes the portion which corresponds to the currently broadcasting portion of the corresponding high resolution version media content event;

receiving a user request while a first one of the plurality of high resolution version media content events is being presented to a user, wherein the user request is a request for presentation of a second one of the plurality of high resolution version media content events, and wherein the second high resolution version media content event is different from the first high resolution version media content event;

retrieving, in response to receiving the user request, the stored low resolution segment that includes the portion which corresponds to the currently broadcasting portion of the second high resolution version media content event from the memory of the media device;

presenting the retrieved low resolution segment on a display to the user;

tuning the media device to receive a broadcasted high resolution content stream that comprises the requested second high resolution version media content event in response to receiving the user request,
  wherein the retrieved low resolution segment that includes the portion which corresponds to the currently broadcasting portion of the corresponding second high resolution version media content event continues to be presented on the display while the media device is tuning to the broadcasted high resolution content stream;

ending presentation of the low resolution segment on the display after the tuning of the media device to receive the second high resolution version media content event; and starting presentation of the requested high resolution version of the media content event on the display in response to ending presentation of the low resolution segment.

2. The method of claim 1, wherein receiving the plurality of low resolution version media content events at the media device comprises:
  receiving the plurality of low resolution version media content events from one of a media transmit facility (MTF) internet content manager or a regional internet content manager that is communicatively coupled to the media device via the communication network,
  wherein the segmenting of the low resolution content stream into the plurality of low resolution segments that include the portion which corresponds to the currently broadcasting portion of the corresponding one of the plurality of high resolution version media content events occurs at one of the MTF internet content manager or the regional internet content manager prior to communicating the low resolution content stream to the media device.

3. The method of claim 1, wherein receiving the low resolution version of the media content event at the media device comprises:
  receiving the low resolution version of the media content event from one of a media transmit facility (MTF) internet content manager or a regional internet content manager that is communicatively coupled to the media device via the communication network,
  wherein the segmenting of the low resolution content stream into the plurality of low resolution segments that include the portion which corresponds to the currently broadcasting portion of the corresponding one of the plurality of high resolution version media content events occurs at the media device after the low resolution content stream is communicated from one of the MTF internet content manager or the regional internet content manager to the media device.

4. The method of claim 1,
  wherein the high resolution version of the media content event comprises a series of high resolution video image frames that are each uniquely identified by a first identifier,
  wherein each one of the plurality of low resolution segments comprises a series of low resolution video image frames that are each uniquely identified by a second identifier, and
  wherein after tuning the media device has been tuned to receive the broadcasted high resolution content stream, the method further comprises:
    selecting one of the high resolution video image frames of the high resolution version of the media content event;
    comparing the first identifier of the selected high resolution video image frame with the second identifiers of the low resolution video image frames being presented on the display;
    wherein ending presentation of the low resolution segment and starting presentation of the requested high resolution version of the media content event occurs when one of the second identifiers corresponds to the first identifier of the selected high resolution video image frame.

5. The method of claim 4,
  wherein ending presentation of the low resolution segment on the display occurs after presentation of a low resolution video image frame that immediately precedes the low resolution video image frame having the second identifier that corresponds to the first identifier of the selected high resolution video image frame, and
  wherein starting presentation of the requested high resolution version of the media content event begins with the selected high resolution video image frame having the first identifier.

6. The method of claim 4, further comprising:
  wherein the first identifier of the selected high resolution video image frame is a presentation time stamp, and
  wherein the second identifier of the corresponding second video image frame is the presentation time stamp.

7. The method of claim 1, the method further comprising:
  presenting a next one of the plurality of low resolution segments after the retrieved low resolution segment has been presented on the display if the media device is not done tuning to the broadcasted high resolution content stream.

8. The method of claim 1,
  wherein a first one of the other low resolution content streams is received from a media transmit facility (MTF) internet content manager that is communicatively coupled to the media device via the communication network,
  wherein the MTF internet content manager is broadcasting the first one of the other low resolution content streams to a plurality of first media devices commonly located in a first geographic region and to a plurality of second media devices commonly located in a second geographic region that is different from the first geographic region,
  wherein a second one of the other low resolution content streams is received from a regional internet content manager that is communicatively coupled to the media device via the communication network, and
  wherein the MTF internet content manager is broadcasting the second one of the other low resolution content streams only to the plurality of first media devices commonly located in the first geographic region.

9. The method of claim 1,
wherein the high resolution version of the media content event comprises a series of high resolution video image frames,
wherein each one of the plurality of low resolution segments comprises a series of low resolution video image frames,
wherein a first video image frame of the high resolution video image frames and a second video image frame of the low resolution video image frames present the same image of the media content event, and
wherein the second video image frame is received at the media device before the first video image frame is received at the media device.

10. The method of claim 1, wherein receiving the low resolution version of a media content event at the media device comprises:
receiving the plurality of the low resolution version media content events at the media device; and
selecting those ones of the plurality of the low resolution version media content events that are associated with favorite channels of the user,
wherein only the selected ones of the plurality of low resolution version media content events that are associated with the favorite channels are segmented, stored and then deleted.

11. The method of claim 1, wherein receiving the low resolution version of a media content event at the media device comprises:
receiving the plurality of the low resolution version media content events at the media device; and
selecting those ones of the plurality of the low resolution version media content events that are associated with user specified channels that have been specified by the user,
wherein only the selected ones of the plurality of low resolution version of the media content events that are associated with the user specified channels are segmented, stored and then deleted.

12. A media device, comprising:
a first interface that communicatively couples the media device to a communication network, wherein the media device receives a plurality of low resolution version media content events via the communication network, wherein each one of the received plurality of low resolution version media content events corresponds to one of a plurality of high resolution version media content events;
a second interface that receives a broadcast of a plurality of media content streams, wherein each broadcasted media content stream comprises at least one of the high resolution version media content events, and wherein the plurality of media content streams are broadcast to a plurality of media devices via a broadcast communication network;
a third interface configured to communicate a selected first one of the plurality of high resolution media content events to a display for presentation to a user;
a memory; and
a processor system, wherein the processor system is configured to:
segment each of the plurality of low resolution version media content events into a plurality of low resolution segments, wherein each low resolution segment includes a portion which corresponds to a currently broadcasting portion of the corresponding one of the plurality of high resolution version media content events;
store each one of the plurality of low resolution segments in the memory of the media device;
receive a user request for presentation of a second one of the plurality of high resolution version media content events;
retrieve the stored low resolution segment corresponding to the second one of the plurality of high resolution version media content events from the memory of the media device in response to receiving the user request, wherein the retrieved low resolution segment is communicated from the third interface to the display such that the retrieved low resolution segment is presented to the user;
tune the second interface to receive the broadcasted high resolution content stream that has the second one of the plurality of high resolution version of the media content events in response to receiving the user request, wherein the low resolution segment corresponding to the second one of the plurality of high resolution version media content events is presented while the second interface is being tuned to receive the second one of the plurality of high resolution version media content events;
end presentation of the low resolution segment in response to completing the tuning of the second interface to receive the second one of the plurality of high resolution version media content events; and
start presentation of the requested second one of the plurality of high resolution version media content events of the user request after the tuning of the second interface has been completed.

13. The media device of claim 12, further comprising:
a program buffer configured to store the requested second one of the plurality of high resolution version media content events of the user request after the tuning of the second interface has been completed,
wherein the second one of the plurality of high resolution version media content events until presentation of the low resolution segment has ended,
wherein the second one of the plurality of high resolution version media content events is then retrieved from the program buffer to start presentation of the second one of the plurality of high resolution version media content events.

14. The media device of claim 12, wherein the processor system is further configured to:
identify a first video image frame in the second one of the plurality of high resolution version media content events; and
identify a second video image frame in the retrieved low resolution segment that is being currently presented to the user,
wherein the first video image frame and the second video image frame present an image that is the same as the second one of the plurality of high resolution version media content events,
wherein presentation of the low resolution segment ends with a third video image frame of the low resolution segment that immediately precedes the second video image frame of the low resolution segment, and
wherein presentation of the requested second one of the plurality of high resolution version media content events starts with the first video image frame after the third video image frame has been presented.

15. The media device of claim 14,
wherein the first video image frame is identified by a first unique identifier,
wherein the second video image frame is identified by a second unique identifier,
wherein the processor system is further configured to:
compare identifiers of each video image frame of the retrieved low resolution segment that is being currently presented to the user with the first unique identifier of the first video image frame,
wherein the third video image frame is identified when the first unique identifier of the first video image frame corresponds to the second unique identifier of the second video image frame.

16. The media device of claim 15, further comprising:
wherein the first unique identifier of the first video image frame is a presentation time stamp, and
wherein the second unique identifier of the second video image frame is the presentation time stamp.

17. The media device of claim 12, further comprising:
a fourth interface configured to receive the user command,
wherein the user command is generated by a remote control in response to a user actuation of at least one controller disposed on the surface of the remote control.

18. A media content system, comprising:
a media transmit facility configured to broadcast a plurality of high resolution media content events over a broadcast communication system, wherein each high resolution media content event resides in one of a plurality of different media content streams;
a plurality of media devices configured to receive the plurality of different media content streams broadcast from the media transmit facility; and
an internet content manager that is configured to communicate a plurality of low resolution media content events concurrently to each one of the plurality of media devices via a communication network that communicatively couples the internet content manager to the plurality of media devices, wherein each one of the plurality of low resolution media content events corresponds to one of the plurality of high resolution media contents event being currently broadcast to the plurality of media devices,
wherein each of the plurality of media devices are configured to:
segment each of the low resolution content streams received from the internet content manager into a plurality of low resolution segments, wherein each of the plurality of low resolution segments includes a portion which corresponds to a currently broadcasting portion of the corresponding high resolution media content event;
store each one of the plurality of low resolution segments in a memory of the media device;
receive, at the media device which is presenting a first high resolution media content event, a user request for presentation of a second high resolution media content event that is different from the first high resolution media content event;
retrieve, in response to the user request, the stored low resolution segment from the memory of the media device that is associated with the second high resolution media content event of the user request, wherein the retrieved low resolution segment is communicated to a display such that the retrieved low resolution segment is presented to the user;
tune, in response to the user request, the media device to receive the broadcasted high resolution content stream that has the second high resolution media content event of the user request;
end presentation of the low resolution segment after the tuning of the media device to receive the second high resolution media content event has been completed; and
start presentation of the requested second high resolution media content event of the user request after the tuning of the media device to receive the second high resolution media content event has been completed.

19. The media content system of claim 18, wherein the broadcast communication system is a satellite-based broadcast system that comprises:
at least one satellite; and
a transport channel generation system residing in the media transmit facility,
wherein the transport channel generation system is configured to communicate the plurality of high resolution media content events in an uplink signal to the satellite, and
wherein the satellite is configured to broadcast the plurality of high resolution media content events in the received uplink signal down to the plurality of media devices.

* * * * *